(12) United States Patent
Stein et al.

(10) Patent No.: US 9,760,799 B2
(45) Date of Patent: Sep. 12, 2017

(54) PIPELINE FOR GENERATING AN INTRINSIC IMAGE

(75) Inventors: Andrew Neil Stein, Pittsburgh, PA (US); Neil Alldrin, Pittsburgh, PA (US); Kshitiz Garg, Pittsburgh, PA (US)

(73) Assignee: Tandent Vision Science, Inc., San Francisco, CA (US)

( * ) Notice: Subject to any disclaimer, the term of this patent is extended or adjusted under 35 U.S.C. 154(b) by 1538 days.

(21) Appl. No.: 12/661,052

(22) Filed: Mar. 10, 2010

(65) Prior Publication Data

US 2011/0222742 A1  Sep. 15, 2011

(51) Int. Cl.
*G06K 9/62* (2006.01)
*G06K 9/00* (2006.01)
*G06K 9/46* (2006.01)

(52) U.S. Cl.
CPC ....... *G06K 9/6209* (2013.01); *G06K 9/00221* (2013.01); *G06K 9/4661* (2013.01)

(58) Field of Classification Search
None
See application file for complete search history.

(56) References Cited

U.S. PATENT DOCUMENTS

| 7,483,564 | B2* | 1/2009 | Jia | 382/154 |
| 7,751,639 | B1* | 7/2010 | Finlayson et al. | 382/254 |
| 2009/0034834 | A1* | 2/2009 | Friedhoff et al. | 382/162 |
| 2011/0085738 | A1* | 4/2011 | Kitamura et al. | 382/199 |

OTHER PUBLICATIONS

L. Xu, F. Qi, and R. Jiang. "Shadow Removal from a Single Image". In ISDA, vol. 2, 2006.*
H. G. Barrow and J. M. Tenenbaum. Recovering intrinsic scene characteristics from images. In A. R. Hanson and E. M. Riseman, editors, Computer Vision Systems, pp. 3-26, New York, 1978. Academic Press.
Y.-C. Chung, J.-M. Wang, R. R. Bailey, S.-W. Chen, S.-L.Chang, and S. Cherng. Physics-based extraction of intrinsic images from a single image: In ICPR, pp. 693-696, 2004.
B. V. Funt, M. S. Drew, and M. Brockington. Recovering shading from color images. In ECCV, pp. 124-132, May 1992.
A. Olmos and F. A. A. Kingdom. A biologically inspired algorithm for the recovery of shading and reflectance images. Perception, 33:1463-1473, 2004.
L. Shen, P. Tan, and S. Lin. Intrinsic image decomposition with non-local texture cues, In CVPR, 2008.

(Continued)

*Primary Examiner* — Fred Hu
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method is provided for processing an image. According to a feature of the present invention, the method comprises the steps of providing an image file depicting an image, in a computer memory, identifying shadow edges in the image, computing gradient information for the image and modifying the gradient information relative to the shadow edges for improved performance of computer functionality in an image processing operation.

18 Claims, 15 Drawing Sheets

(56) References Cited

OTHER PUBLICATIONS

M. F. Tappen, E. H. Adelson, and W. T. Freeman. Estimating intrinsic component images using non-linear regression. In CVPR, 2006.
M. F. Tappen, W. T. Freeman, and E. H. Adelson. Recovering intrinsic images from a single image. In NIPS, pp. 1367-1374, 2003.
M. F. Tappen, W. T. Freeman, and E. H. Adelson. Recovering intrinsic images from a single image. PAMI, 27(9):1459-1472, 2005.
Y. Weiss and W. T. Freeman, What makes a good model of natural images? In CVPR, 2007.
L. Xu, F. Qi, and R. Jiang. Shadow removal from a single image. In ISDA, vol. 2, 2006.
U.S. Appl. No. 12/653,857, filed Dec. 18, 2009.
U.S. Appl. No. 12/653,857, filed Dec. 18, 2009, Casey Arthur Smith.

\* cited by examiner

Pixel Array for Storing Image Data

| P(1, 1) | P(1, 2) | ··· | | ··· | P(1, M) |
|---------|---------|-----|---|-----|---------|
| P(2, 1) | P(2, 2) | | | | ⋮ |
| P(3, 1) | P(3, 2) | | | | |
| ⋮ | | | | | |
| ⋮ | | | | | ⋮ |
| P(N, 1) | ··· | | | ··· | P(N, M) |

Image File
⎿18

FIG. 2

Examples of Identifying Token Regions in an Image

Original Image

Token Regions $$\begin{bmatrix} 1 & -1 & 0 \\ 1 & 0 & -1 \\ 0 & 1 & -1 \end{bmatrix} \begin{bmatrix} l_a \\ l_b \\ l_c \end{bmatrix} = \begin{bmatrix} i_a - i_b \\ i_a - i_c \\ i_b - i_c \end{bmatrix}$$

[A]  [x]  =  [b]

$$\begin{bmatrix} 1 & -1 & 0 \\ 1 & 0 & -1 \\ 0 & 1 & -1 \end{bmatrix} \begin{bmatrix} l_a \\ l_b \\ l_c \end{bmatrix} = \begin{bmatrix} i_a - i_b - d_{ab} \\ i_a - i_c - d_{ac} \\ i_b - i_c - d_{bc} \end{bmatrix}$$

Figure 8

PIPELINE FOR GENERATING AN INTRINSIC IMAGE

BACKGROUND OF THE INVENTION

Many significant and commercially important uses of modern computer technology relate to images. These include image processing, image analysis and computer vision applications. A challenge in the utilization of computers to accurately and correctly perform operations relating to images is the inability of a computer to correctly distinguish between a shadow and a material object edge within an image, such as a feature of a face depicted in the image, and obscured by an overlying shadow. Thus, for example, many known computer face recognition programs require highly controlled illumination conditions for accurate performance. For correct face recognition under uncontrolled illumination conditions, a computer must be able to identify structures and features of a face that can be modified in appearance due to overlying shadows.

Cognitive processing of the human brain makes it possible for humans to automatically distinguish shadow from object. However, to a computer, the image is all pixel values of varying color characteristics. Accordingly, there is a persistent need for the development of accurate and correct techniques that can be utilized in the operations of computers relating to images, to provide an image appearance optimized for further processing. For example, in computer vision applications such as object recognition, face recognition and optical character recognition, it has been found that a separation of illumination and material aspects of an image into corresponding intrinsic images can significantly improve the accuracy of computer performance.

SUMMARY OF THE INVENTION

The present invention provides a method and system implementing image processing techniques that utilize spatio-spectral information relevant to an image, to perform an operation to accurately and correctly identify and separate illumination and material aspects of the image to generate intrinsic images for optimization of the image for use in computer tasks such as, for example, face recognition.

In a first exemplary embodiment of the present invention, an automated, computerized method is provided for processing an image. According to a feature of the present invention, the method comprises the steps of providing an image file depicting an image, in a computer memory, identifying shadow edges in the image, computing gradient information for the image and modifying the gradient information relative to the shadow edges for improved performance of computer functionality in an image processing operation.

According to a feature of the first exemplary embodiment of the present invention, an estimate of an output image is made, for example, a reintegration is performed as a function of modified gradient information, to provide an output image optimized for an image processing operation.

In a second exemplary embodiment of the present invention, a computer system is provided. The computer system comprises a CPU and a memory storing an image file containing an image. According to a feature of the present invention, the CPU is arranged and configured to execute a routine to identify shadow edges in the image, compute gradient information for the image and modify the gradient information relative to the shadow edges for improved performance of computer functionality in an image processing operation.

In a third exemplary embodiment of the present invention, a computer program product is provided. According to a feature of the present invention, the computer program product is disposed on a computer readable media, and the product includes computer executable process steps operable to control a computer to: identify shadow edges in an image, compute gradient information for the image and modify the gradient information relative to the shadow edges for improved performance of computer functionality in an image processing operation.

In accordance with yet further embodiments of the present invention, computer systems are provided, which include one or more computers configured (e.g., programmed) to perform the methods described above. In accordance with other embodiments of the present invention, computer program products, including computer readable media, are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programmed to carry out the steps of the methods of the present invention.

BRIEF DESCRIPTION OF THE DRAWINGS

FIG. 2 shows an [N×M] pixel array image file for an image stored in the computer system of FIG. 1.

FIG. 6b shows Type C token regions in the image of FIG. 6a.

FIG. 8 is a representation of an [A][x]=[b] matrix relationship used to identify and separate illumination and material aspects of an image, according to a smooth-illumination constraint feature of the present invention.

DETAILED DESCRIPTION OF THE PREFERRED EMBODIMENTS

Figure 1:
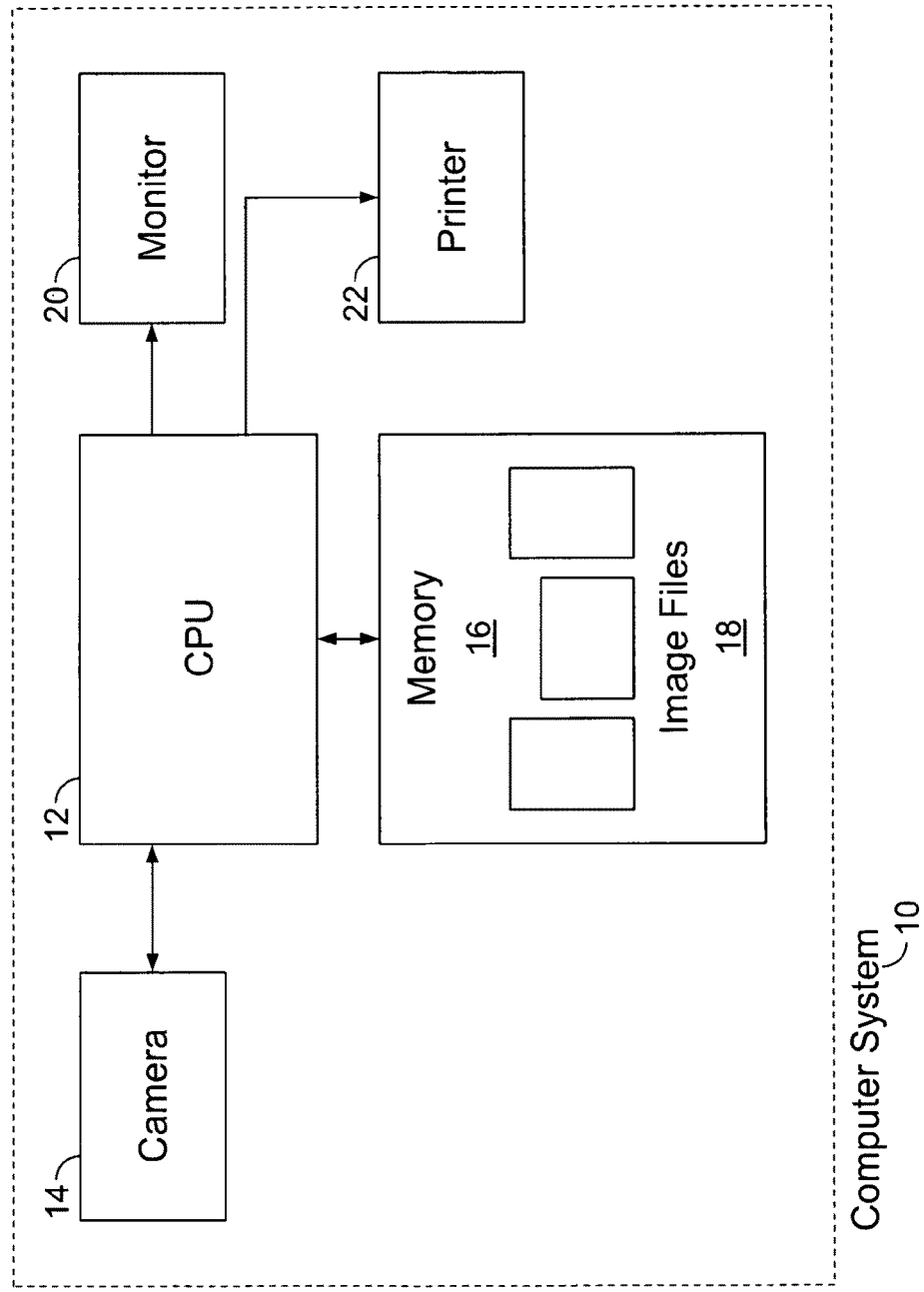
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an [N×M] pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electromagnetic spectrum, and can also be implemented in respect of a grayscale image. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

According to a feature of the present invention, in an image process, the CPU 12 operates to analyze and process information, for example, the RGB values of the pixels of an image stored in an image file 18, to achieve various objectives, such as, for example, a correct and accurate identification of illumination and material aspects of the image to generate intrinsic images for optimization of the image for improved performance of a task such as a face recognition operation. The intrinsic images correspond to an original image, for example, an image depicted in an input image file 18. The intrinsic images include, for example, an illumination image, to capture the intensity and color of light incident upon each point on the surfaces depicted in the image, and a material reflectance image, to capture reflectance properties of surfaces depicted in the image (the percentage of each wavelength of light a surface reflects).

As noted, a separation of illumination from material provides the CPU 12 with images optimized for such tasks as, for example, face recognition. In the performance of operations to segregate an image into illumination and material aspects of the image, it has been found that the resulting the resulting illumination image may contain potentially undesirable illumination effects such as cast shadow edges and strong trends that can make one side of an image brighter than the other side, for example, when a face is lit from one side. Image information, for example, the depiction of a face, is most accurately depicted when there is diffuse illumination across the image such that illumination variation is caused by changes in the geometry of the face, and not by strong cast shadow edges from the brow, nose, or from external sources such as hats.

A fundamental observation underlying a basic discovery of the present invention, is that an image comprises two components, material and illumination. All changes in an image are caused by one or the other of these components. Spatio-spectral information is information relevant to contiguous pixels of an image depicted in an image file 18, such as spectral relationships among contiguous pixels, in terms of color bands, for example RGB values of the pixels, and the spatial extent of the pixel spectral characteristics relevant to a characteristic of the image, such as, for example, a single material depicted in the image or illumination flux affecting the image.

According to the present invention, spatio-spectral information is utilized to identify the illumination and material aspects of an image. When one of material and illumination is known in an image, the other can be readily deduced, for example, according to the equation I=ML, wherein I is the intensity of an image pixel, as recorded and stored in an image file 18, M is the material color (reflectance) and L the illumination value. Moreover, the present invention provides gradient editing and reintegration techniques that are implemented with respect to, for example, shadow edges, for optimization of the image for further processing.

Figure 3:
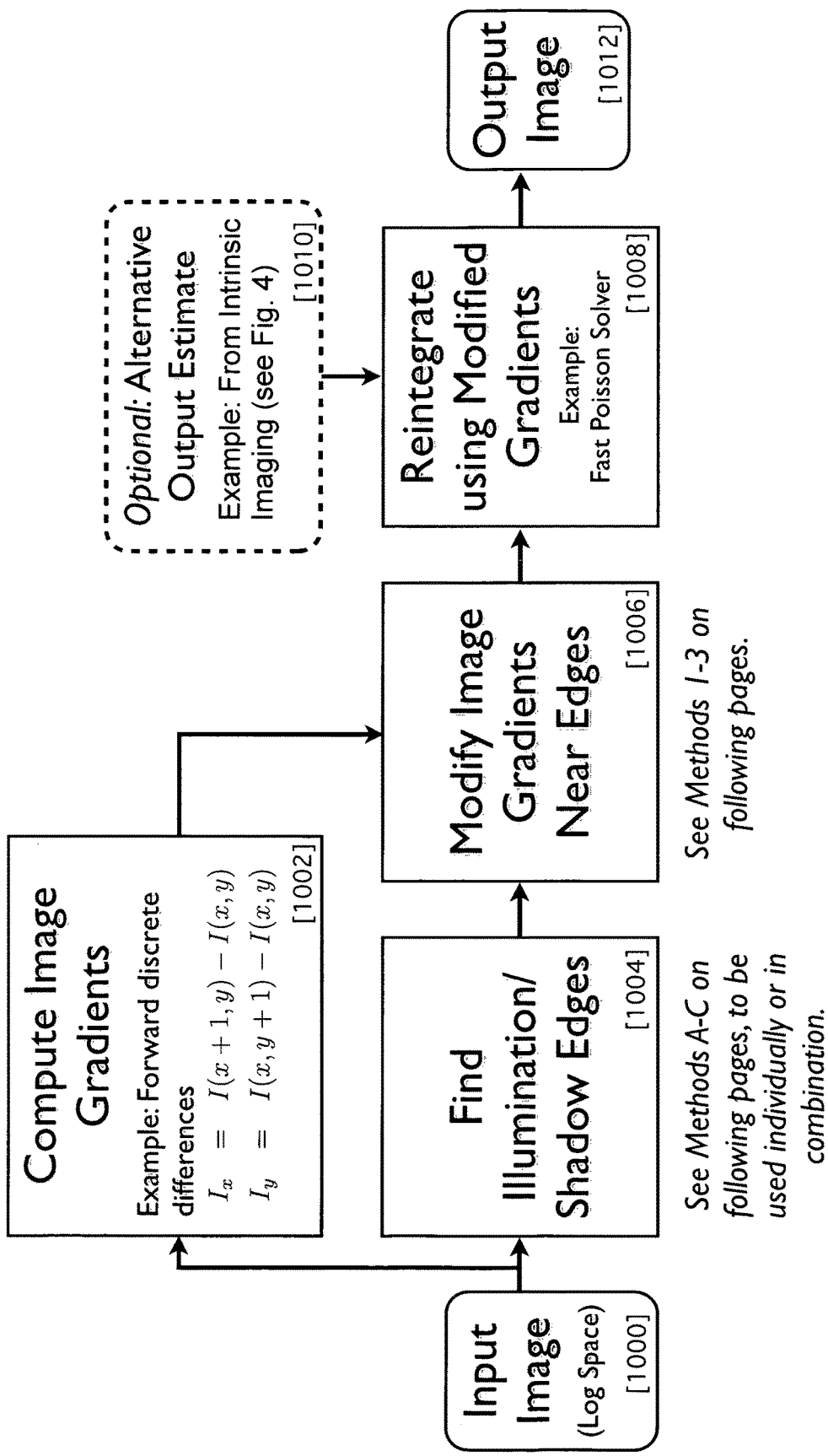
FIG. 3 is a flow chart showing a routine for generating intrinsic images using gradient editing and reintegration according to a feature of the present invention.

Referring now to FIG. 3, there is shown a flow chart for a routine for generating intrinsic images using gradient editing and reintegration according to a feature of the present invention. In step 1000, an input image, such as an image file 18, is input to the CPU 12. In an alternative embodiment of the present invention, the input image can be an intrinsic image corresponding to an image of an image file 18. The intrinsic image can be, for example, an illumination image such as the output in step 1026 of FIG. 4, as will be described below.

In parallel operations, the CPU 12 computes image gradients (step 1002), and identifies shadow edges, for example, by generating an illumination image depicting shadow edges (step 1004).

In step 1002, the CPU 12 implements the image gradient computation by computing a gradient for each pixel p(n, m) of the image file 18 (or the illumination image corresponding to the image file 18). Gradients are often utilized to provide a more suitable representation of an image for purposes of computer processing. A gradient is a measure of the magnitude and direction of color and/or color intensity change within an image, as for example, across edges caused by shadows or features of objects depicted in the image. Any known method can be implemented to calculate the image gradients, as for example, computation of forward discrete differences (an intensity gradient in the x direction for a pixel, $I_x=I(x+1, y)-I(x, y)$; an intensity gradient in the y direction, $I_y=I(x, y+1)-I(x, y)$).

In step 1004, according to a feature of the present invention, the CPU 12 identifies shadow edges in the image depicted in input image file 18, via any one of several different techniques. The shadow edge detection techniques include generation of an illumination image that is used to identify shadow edges, using a direct shadow edge classifier according to a known computer learning technique, and/or an object model such as, for example, a specific active shape model, according to a known statistical model. Various combinations of the edge identification techniques can be implemented to optimize the accuracy of shadow edge detection.

In step 1006, the CPU 12 operates to modify image gradients near shadow edges identified in step 1004, to provide a basis for an output image optimized for further processing. The gradient modification can be implemented as a simple masking of gradients near shadow edges, an orthogonal projection or a fitting of an illumination profile.

In step 1008, the CPU 12 computes an estimate of the output image, given the modified gradient field from step 1006. This estimation is performed, for example, using a reintegration procedure, which estimates a function, such as one color band of a image, f(x,y), from its gradients g(x,y):

$$\iint \|\nabla f - g\|^2 dx dy$$

The reintegration procedure can be performed utilizing any well-known technique, for example, using a Poisson solver. Optionally, a data term, u, can be specified to require that the solution f be close to an alternate estimate of the solution (as weighted by w), for example, the original image or the reflectance estimated from an intrinsic imaging technique such as the one described in respect to FIG. 4 below. In this case, the objective function becomes:

$$\iint \|\nabla f - g\|^2 + w \cdot (f-u)^2 dx dy$$

In step 1012, the CPU 12 outputs an output image (from the reintegration of step 1008) for further processing, as for example, for input to a face recognition process. Due to the modifications to the gradients near shadow edges, the output image will illustrate, for example, image information that is depicted in a manner that results in improved performance of a face recognition task.

Figure 4:
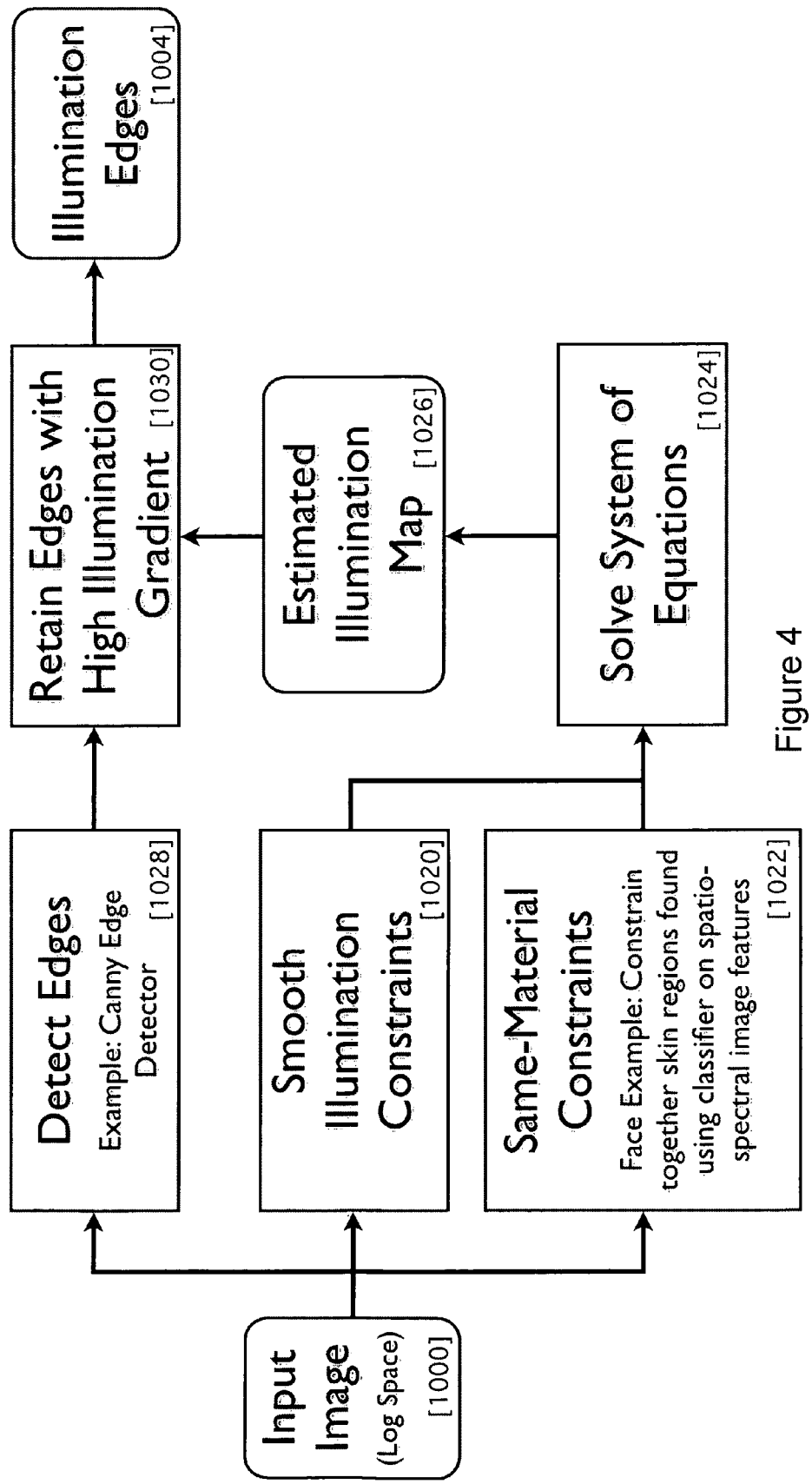
FIG. 4 is a flow chart for identifying shadow edges in an image, using intrinsic images, the shadow edges being used in the routine of FIG. 3, according to a feature of the present invention.

Referring now to FIG. 4, there is shown a flow chart for identifying shadow edges in an image (step 1004 of FIG. 3), using intrinsic images, the identified shadow edges being used in the routine of FIG. 3, according to a feature of the present invention. In steps 1020 and 1022, the CPU 12 concatenates matrices defining smooth illumination and same-material constraints relevant to the input image file 18. For example, a constraint/solver model is implemented to segregate the input image file 18, after a tokenization is performed to identify a dominant region of single reflectance, such as skin of a face.

Images depicted in some image files 18 are dominated by a single material or region of single reflectance, for example, a lawn in a sports playing field, or skin in a human face. In such a case, the present invention utilizes the fact of the dominance of a single reflectance region of an image, to improve computer operations relevant to the generation of intrinsic images. Initially, a tokenization is performed to identify Type C tokens in the input image file 18. A Type C token comprises a single robust color measurement among contiguous pixels of the image.

Figure 5:
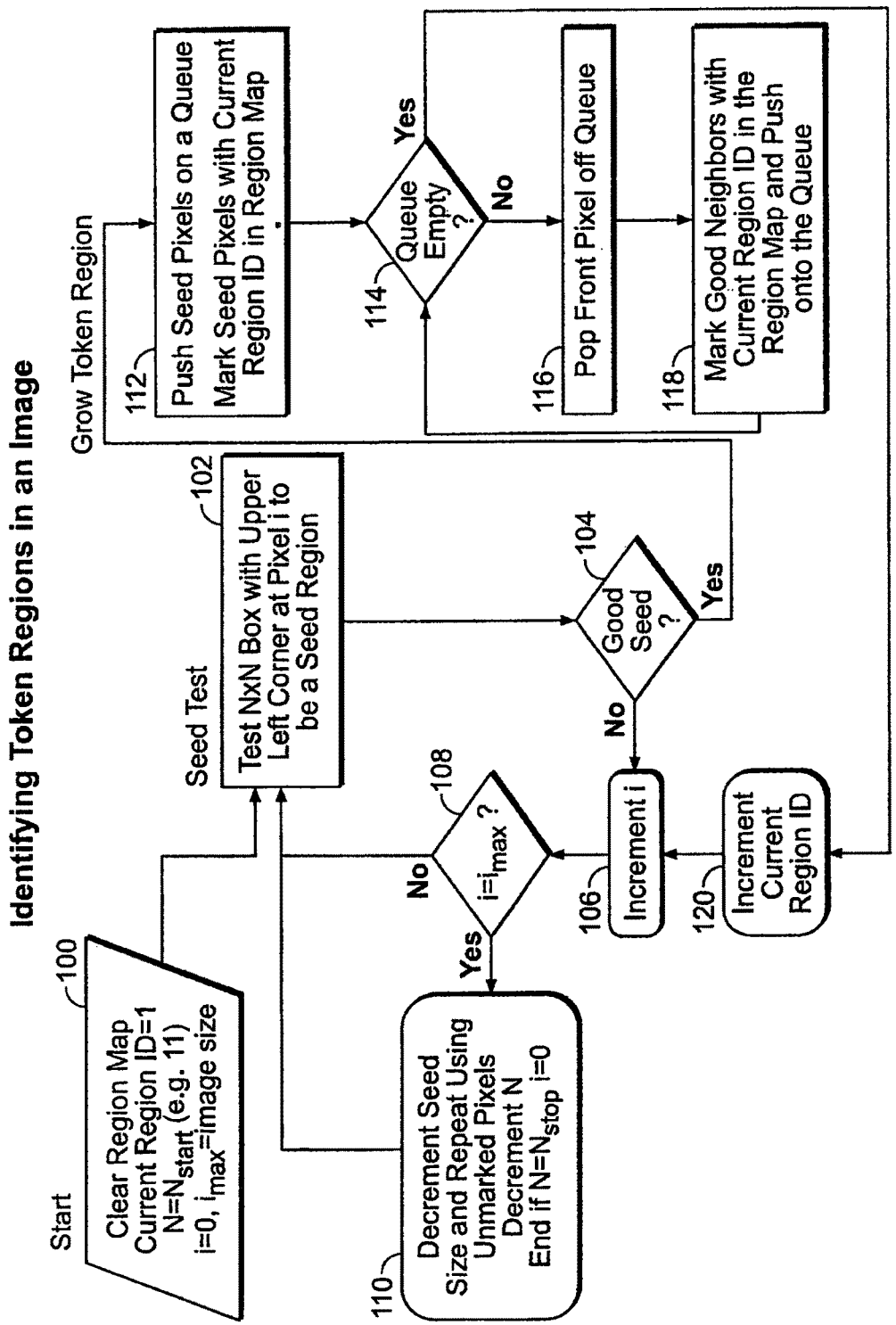
FIG. 5 is a flow chart for identifying Type C token regions in the image file of FIG. 2, according to a feature of the present invention.

FIG. 5 is a flow chart for identifying Type C token regions in the image file of FIG. 2, according to a feature of the present invention. At the start of the identification routine of FIG. 5, the CPU 12 sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, $N=N_{start}$. $N_{start}$ can be any integer >0, for example it can be set at set at 11 or 15 pixels.

At step 102, a seed test is begun. The CPU 12 selects a first pixel, i=(1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel or the filter output intensity histogram representation of the pixel, in the event the image was filtered for texture regions, as described above.

If the comparison does not result in approximately equal values (for example, within the noise levels of the recording device for RGB values) for the pixels in the seed, the CPU 12 increments the value of i (step 106), for example, i=(1, 2), for a next N×N seed sample, and then tests to determine if $i=i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at i=(n, m). In this manner, the routine of FIG. 5 parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token. In the event the pixels comprise intensity histogram representations, the token can be marked as Type $C_T$.

When the queue is empty, the CPU 12 proceeds to step 120. At step 120, the CPU 12 increments the region ID for use with identification of a next token. The CPU 12 then returns to step 106 to repeat the routine in respect of the new current token region.

Figure 6A:
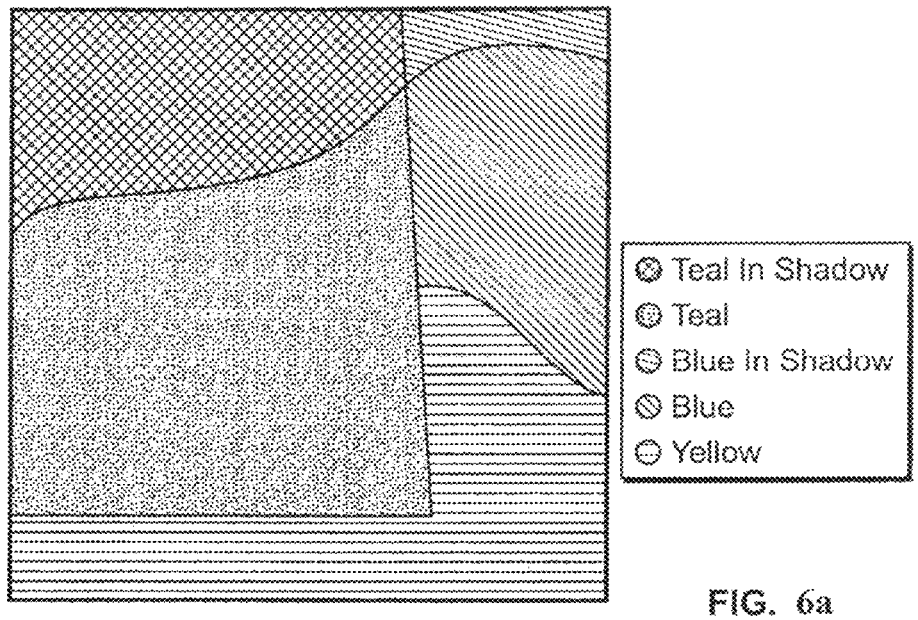
FIG. 6a is an original image used as an example in the identification of Type C tokens.
Figure 6B:
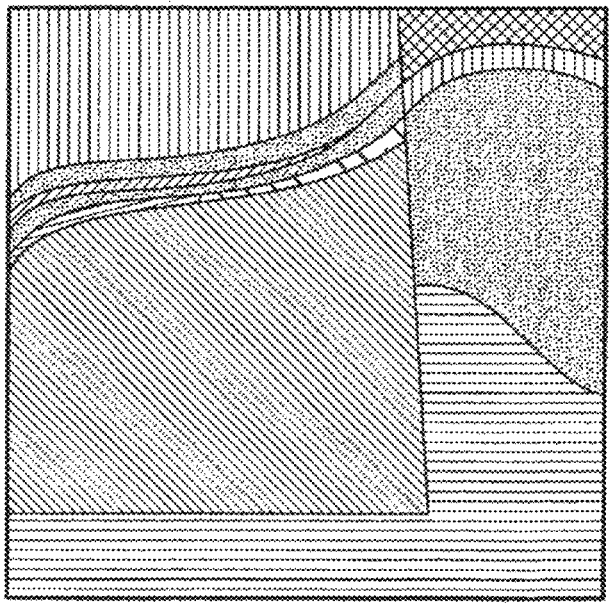

Upon arrival at $N=N_{stop}$, step 110 of the flow chart of FIG. 5, or completion of a region map that coincides with the image, the routine will have completed the token building task. FIG. 6a is an original image used as an example in the identification of tokens. The image shows areas of the color blue and the blue in shadow, and of the color teal and the teal in shadow. FIG. 6b shows token regions corresponding to the region map, for example, as identified through execution of the routine of FIG. 5 (Type C tokens), in respect to the image of FIG. 6a. The token regions are color coded to illustrate the token makeup of the image of FIG. 6a, including penumbra regions between the full color blue and teal areas of the image and the shadow of the colored areas.

According to a feature of the present invention, the CPU 12 performs an analysis of the identified Type C tokens. Type C tokens that include, for example, skin pixels in an image depicting a face, will be large relative to tokens corresponding to pixels representing other features of the face, for example, eyebrows, lips, the iris of the eye, and so on. Thus, a threshold value for a number of pixels in a token can be set so as to be able to identify relatively large tokens, and thereby establish the region of a dominant, single reflectance. For example, the threshold size can be set as a function of the interocular distance (the distance between the eyes), such as: threshold=(interocular distance in pixels)/7.

As an alternative, a region of a dominant, single reflectance can be identified using a model of the object or a classifier, according to a known computer learning technique, for example, a skin classifier. In the case of a skin classifier, a set of training images having positive and negative examples of a human face is used to train the skin classifier based upon image features indicative of skin regions of a human face. The classifier is then applied to an input image file 18 to identify all pixels of a skin region of a face as a dominant region of single reflectance.

Figure 7:
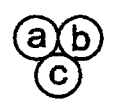
FIG. 7 is a representation of an [A][x]=[b] matrix relationship used to identify and separate illumination and material aspects of an image, according to a same-material constraint feature of the present invention.

All of the Type C tokens identified as being in a region of single reflectance are constrained in a matrix equation, to be of a same material (step 1022). All adjacent Type C tokens of the image of the image file 18 are also constrained in a matrix equation to be in a smooth-illumination constraint (step 1020). FIG. 7 is a representation of an [A][x]=[b] matrix relationship used to identify and separate illumination and material aspects of an image, according to a same-material constraint feature of the present invention. Based upon the previously discussed I=ML equation, log(I)=log(ML)=log(M)+log(L). This can be restated as i=m+l, wherein i represents log(I), m represents log(M) and l represents log(L). In the constraining relationship of a same material, in an example where three Type C tokens, a, b and c, (as shown in FIG. 7) are within the region of single reflectance, as determined by the token size analysis, $m_a=m_b=m_c$.

For the purpose of this example, the I value for each Type C token is the average color value for the recorded color values of the constituent pixels of the token. Since: $m_a=i_a-l_a$, $m_b=i_b-l_b$, and $m_c=i_c-l_c$, these mathematical relationships can be expressed, in a same material constraint, as $(1)l_a+(-1)l_b+(0)l_c=(i_a-i_b)$, $(1)l_a+(0)l_b+(-1)l_c=(i_a-i_c)$ and $(0)l_a+(1)l_b+(-1)l_c=(i_b-i_c)$.

Thus, in the matrix equation of FIG. 7, the various values for the log(I) ($i_a$, $i_b$ $i_c$), in the [b] matrix, are known from the average recorded pixel color values for the constituent pixels of the adjacent Type C tokens a, b and c. The [A] matrix of 0's, 1's and −1's, is defined by the set of equations expressing the same material constraint, as described above. The number of rows in the [A] matrix, from top to bottom, corresponds to the number of actual constraints imposed on the tokens, in this case three, the same material constraint between the three adjacent Type C tokens a, b and c. The number of columns in the [A] matrix, from left to right, corresponds to the number of unknowns to be solved for, again, in this case, the three illumination values for the three tokens. Therefore, the values for the illumination components of each Type C token a, b and c, in the [x] matrix, can be solved for in the matrix equation. It should be noted that each value is either a vector of three values corresponding to the color bands (such as red, green, and blue) of our example or can be a single value, such as in a grayscale image.

FIG. 8 is a representation of an [A][x]=[b] matrix relationship used to identify and separate illumination and material aspects of an image, according to a smooth-illumination constraint feature of the present invention. In the [b] matrix of FIG. 8, the $d_{ab}$, $d_{ac}$, and $d_{bc}$, terms are each an expression of the log difference between values for pixels along a boundary between adjacent tokens. The CPU 12 examines pairs of pixels along a boundary, for example, for the term $d_{ab}$, the CPU 12 examines pixel pairs, one pixel per token, along the boundary between token a and token b. The CPU 12 records the difference in log image values for each pair, and then aggregates the recorded values for a single difference of log values for the token pair. The aggregation procedure can be implemented as a mean, median, mean shift or any other standard distribution characterization.

In step 1024, to solve the system of equations depicted in FIGS. 7 and 8, the CPU 12 performs a least squares solution. In a standard least squares solution, the matrix equations of FIGS. 7 and 8 are concatenated, and the resulting matrix array (with the matrix of FIG. 7 representing all Type C tokens of the dominant region and the matrix of FIG. 8 representing all adjacent Type C tokens of the image file 18), is restated as min over x of $(Ax-b)^2$. The CPU 12 then executes the least squares operation to simultaneously determine optimized values for each of $l_a$, $l_b$ and $l_c$. The CPU 12 can then proceed to generate and display an illumination image based upon the optimal $l_a$, $l_b$ and $l_c$ values. The CPU 12 operates to find a solution that maximally makes all of the Type C tokens (or pixels) in the dominant region the same color while simultaneously making the illumination field as smooth as possible across all adjacent Type C tokens in the image.

In general, the CPU 12 is operated to weigh the constraints such that violating the same-material constraints is very expensive relative to violating the smooth illumination constraints. This makes sure that the solution to the over-constrained system of equations results in the tokens (or pixels) in the same-material dominant region being almost perfectly a uniform color.

To obtain the illumination image, (step 1026), the $l_a$, $l_b$ and $l_c$ optimized values are substituted for the originally recorded RGB values, for each pixel of the respective tokens. As noted above, the matrix equation is arranged to express a same-material constraint between all of the Type C tokens identified as being in the dominant region of single reflectance, and a smooth-illumination constraint between all adjacent pairs of Type C tokens in the image of the image file 18. The CPU 12 can proceed to also generate a material image by calculating the $m_a$, $m_b$, $m_c$ values from the known recorded image values $i_a$, $i_b$, $i_c$, and the determined $l_a$, $l_b$ and $l_c$ values, utilizing the model expressed by i=m+1. The material image can optionally be used in step 1010 of FIG. 3, as described above.

Referring once again to FIG. 4, the CPU 12 operates, in step 1028, to detect edges in the image depicted in the input image file 18. The CPU 12 can execute a known Canny edge detector to identify by pixels, all edges in the input image file 18. In step 1030, the CPU 12 examines the edges identified in step 1028, correlating the edge information with gradient magnitudes for the corresponding pixels in the illumination image generated in step 1026, to identify illumination edges.

As noted above, the illumination image contains potentially undesirable illumination effects such as cast shadows and strong trends that can make one side of an image brighter than the other side, for example, when a face is lit from one side. The illumination edges caused by undesirable illumination effects contain pixels that have relatively large gradient values. All illumination edges (as shown in the illumination image) with pixels having a gradient above a preselected threshold value are identified as shadow edges and output in step 1004. The threshold can be set based upon empirical data.

Figure 9A:
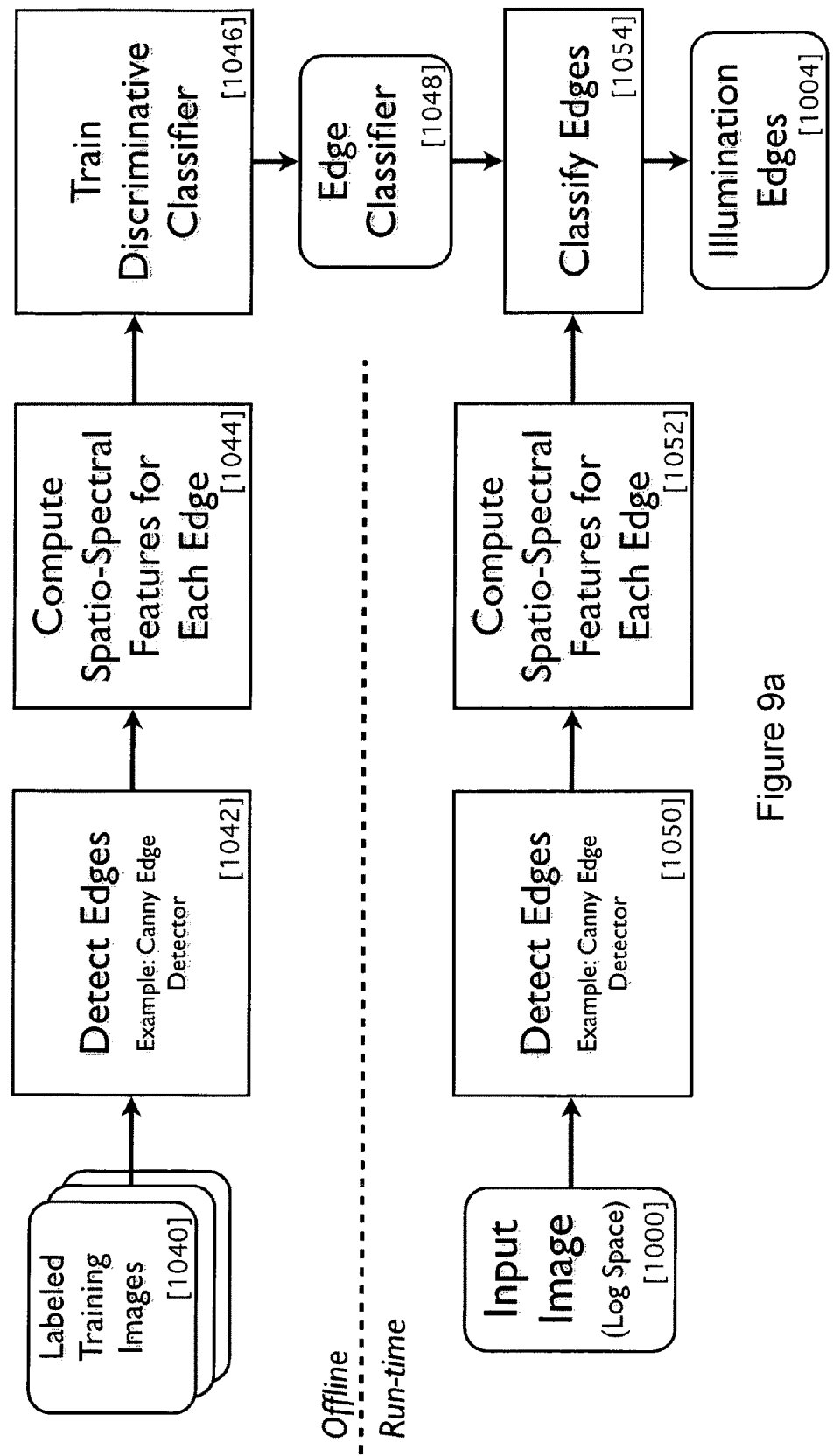
FIG. 9a is a flow chart for identifying shadow edges in an image, using a direct shadow edge classifier of a known computer learning technique, the shadow edges being used in the routine of FIG. 3, according to a feature of the present invention.

Referring now to FIG. 9a, there is shown a flow chart for identifying shadow edges in an image (step 1004 of FIG. 3), using a direct discriminative classifier of a known computer learning technique, the identified shadow edges being used in the routine of FIG. 3, according to a feature of the present invention. In step 1040, in an offline operation, the CPU 12 is provided with a set of labeled training images. The labeled training images includes image files showing faces, and each image file of the training set is manually coded to indicate each of the edges depicted in the respective image file.

In an exemplary embodiment of the present invention, the coding is a color coding wherein a human operator views each image file and in a touch screen, brush stroke operation, marks off each edge, and controls the computer to assign a different arbitrary color to each marked region, as a function of the type of edge. For example, a distinct color can be assigned to material edges, each specific contour edge, for example, eye lids, nose, chin, lips and so on, and sharp shadow edges across the face.

In step 1042, the CPU 12 executes an edge detection, such as, for example, a Canny edge detector, to identify the pixels that define image edges. In step 1044, the CPU 12 computes spatio-spectral features for each edge of each image file of the training set. The computed spatio-spectral features for an edge are concatenated to provide a feature vector for the edge. The feature vectors for all the edges of all the image files of the training set are then used to train a discriminative classifier, according to a known computer learning technique such as, for example, a Support Vector Machine (SVM), as will appear.

According to a feature of the present invention, the spatio-spectral features are computed in terms of pixels of the image files of the training set that are mapped into an edge space coordinate system for a grayscale version of the image. The spatio-spectral features are defined relative to the edge space so as to provide information that can be used to identify features of interest, in our case, illumination edges depicted in an input image file 18. The edge space is a D, T, L space, wherein D=distance of an image pixel from the nearest edge pixel, as identified via the Canny edge detector (step 1042), T=the distance of the subject pixel along the edge, and L=an indication for the specific edge of the image in which the nearest edge pixel is located. Pixels within a preselected distance D of a nearest edge pixel of an identified edge define a strip along the length T of the edge (see the edge profile of FIG. 9b).

Spatio-spectral features for the feature vectors are based upon an average grayscale profile across T, for each edge (see the average profile of FIG. 9b), and a grayscale "dark" side versus "light" side analysis of the strip of the subject edge, as will be described.

Figure 9B:
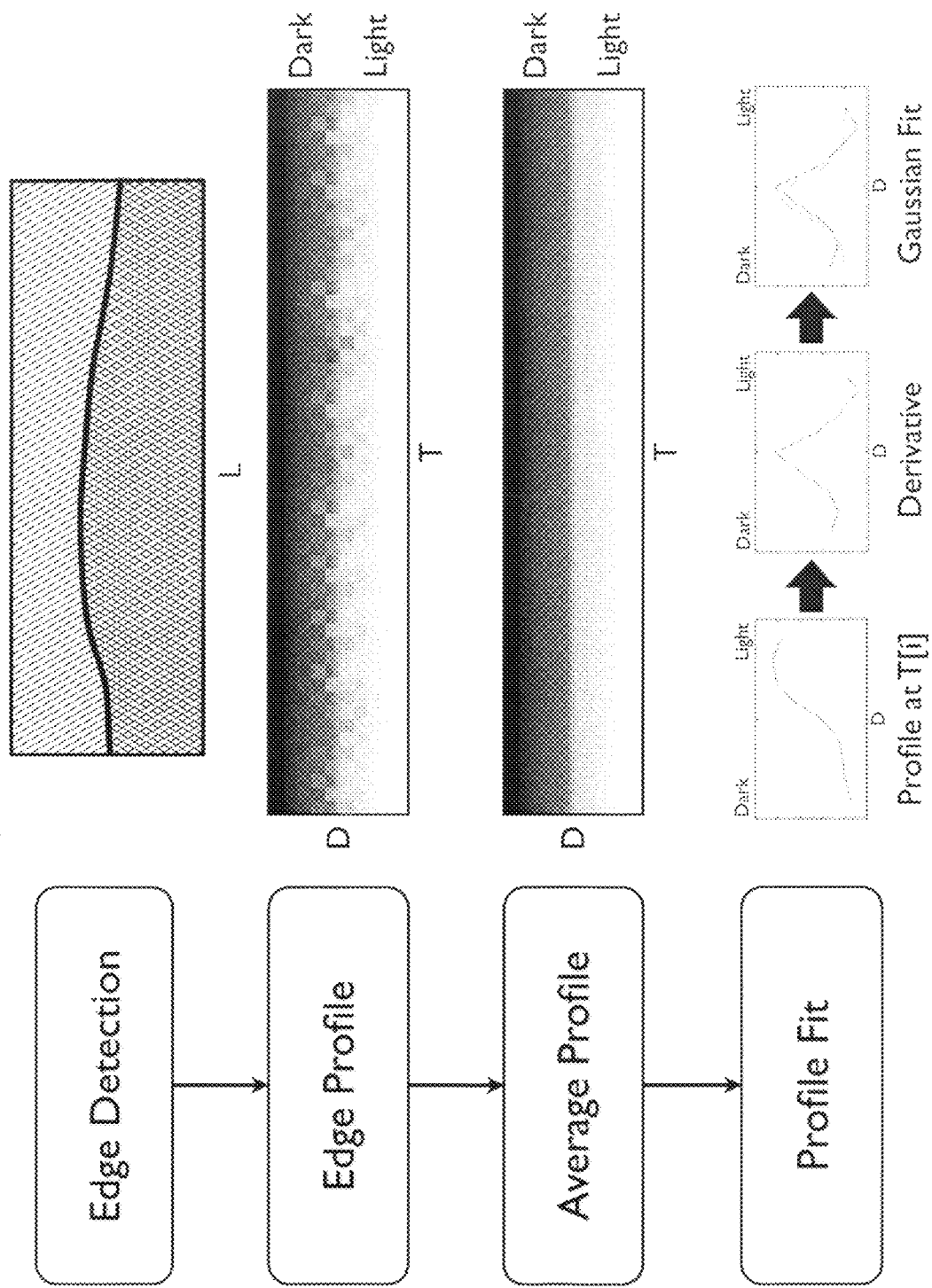
FIG. 9b is a grayscale representation of an exemplary edge strip, for use in an edge analysis for building a direct shadow edge classifier according to the flow chart of FIG. 9a, and showing a detected image edge, a pixel based profile of the edge, an average for the profile and graphs relative to a profile fit.

Referring now to FIG. 9b, there is shown a grayscale representation of an exemplary edge strip L, as detected in step 1042, for use in an edge feature analysis according to the flow chart of FIG. 9a. For each pixel position along the axis T of the edge, there is a grayscale profile relative, pixel by pixel, to the distance D from light to dark, along D, as shown in FIG. 9b, on the graph labeled "profile." According to a feature of the present invention, an average profile is computed for all pixel positions along T (see the average profile of FIG. 9b). A derivative is then calculated for the average profile (as shown in FIG. 9b, on the graph labeled "derivative").

A number of features in the spatio-spectral feature vector are derived from fitting a Gaussian model to the derivative of the average profile (see FIG. 9b, on the graph labeled "Gaussian fit"). Specifically, the residual of the fit, as well as the fit parameters (a,b), according to the formula: $g(x)=a*e^{(-b*x^2)}$, are used as features. Such Gaussian fit features are computed for each edge point (pixel) of each image file of the training set.

For a grayscale "dark" side versus "light" side analysis of each edge of each image file of the training set, reference is again made to the grayscale representation of an exemplary edge strip, as shown in FIG. 9b. A dark side of the strip includes all pixels above the pixels identified as edge pixels in step 1042 of FIG. 9a (as marked in FIG. 9b). A light side of the strip includes all pixels below the pixels identified as edge pixels. For a first feature based upon a grayscale "dark" side versus "light" side analysis, a variance of pixel values, from the dark side and light side of the strip, is computed.

For a second feature based upon a grayscale "dark" side versus "light" side analysis, a variance of modified gradient magnitudes, from the dark side and light side of the strip, is computed. According to a feature of the present invention, a computation of modified gradients is performed by mapping pixels to an edge point. The mapping is executed by projecting an average profile gradient onto each particular pixel location (using the orientation of the edge point to split into x and y components), and subtracting the original gradient for the pixel from the projected average gradient.

For a further feature based upon a grayscale "dark" side versus "light" side analysis, a histogram comparison is made of modified gradient orientations from the dark side and light side of the strip. As with the Gaussian fit features, the features based upon a grayscale "dark" side versus "light" side analysis are computed for each edge of each image file of the training set. All of the features computed for each edge of each image file are concatenated into a feature vector for that edge, to provide a feature vector for each edge.

Referring once again to FIG. 9a, in step 1046, the CPU 12 utilizes the feature vectors to train a discriminative classifier, for example, according to a known computer learning technique such as an SVM classifier. In a learning technique, a classifier is built from the training set, for use in the learning technique, to classify features of an image under examination as being, for example, illumination edges. The parameters of the classifier are trained on the feature vectors extracted from the training set, as described above.

As noted above, the features for each feature vector are selected so as to provide information that can be used to identify illumination edges depicted in an input image file 18. Upon completion of the training task, the CPU 12 outputs an edge classifier (step 1048). A classifier is a process or algorithm that takes feature vectors extracted from an input image file 18 and outputs predictions or classifications regarding illumination and material aspects of an image depicted in the input image file 18, as for example, in our case, illumination edges.

According to a feature of the present invention, the edge classifier is utilized by the CPU 12 in a run-time operation. In steps 1050 and 1052, the CPU 12 performs the same functions that it performed in steps 1042 and 1044, but now in respect to an input image file 18 (step 1000), to generate a feature vector for each edge of an image depicted in the input image file 18, each feature vector including a concatenation of the Gaussian fit features and features based upon a grayscale "dark" side versus "light" side analysis, as described above.

In step 1054, the CPU 12 applies the edge classifier trained in the off-line operation (step 1048) to the feature vectors for the current input image file 18, to classify each edge of the image depicted in the input image file 18. The classification can be in the form of a score, for example, of from 0 to 1, with a score of 0 for an edge of the image corresponding to no likelihood that the edge is an illumination edge and a 1 corresponding to a high likelihood that the edge is an illumination edge. A threshold value can be selected, for example, 0.8, such that each edge with a score that is above 0.8 is considered an illumination edge, and output as a shadow edge in step 1004.

Figure 10:
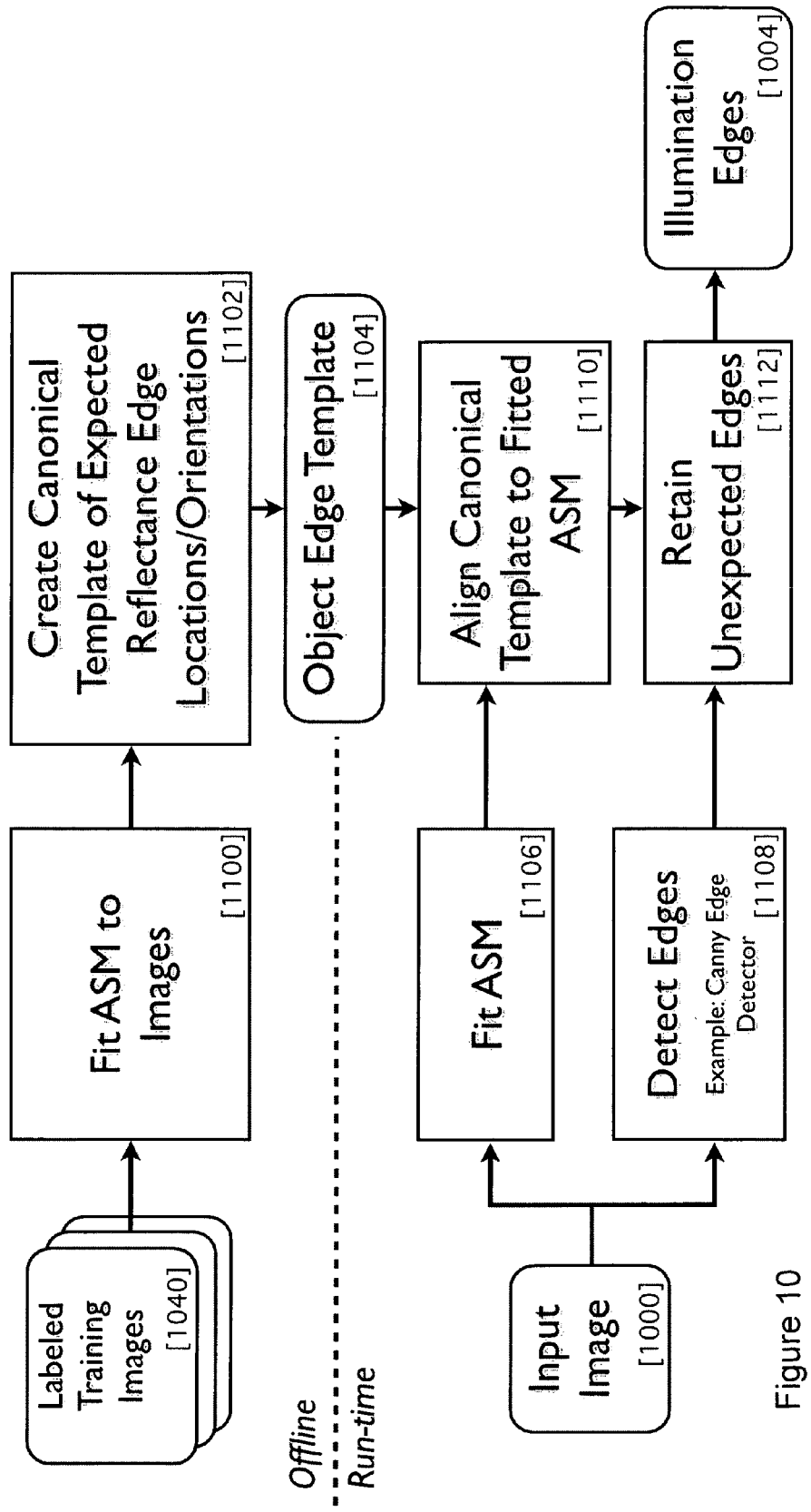
FIG. 10 is a flow chart for identifying shadow edges in an image, using an object model such as an active shape model of a known statistical model technique, the shadow edges being used in the routine of FIG. 3, according to a feature of the present invention.

Referring now to FIG. 10, there is shown a flow chart for identifying shadow edges in an image (step 1004 of FIG. 3), using an object model, the identified shadow edges being used in the routine of FIG. 3, according to a feature of the present invention. The object model can be implemented as, for example, a geometric model or an active shape model (ASM). An exemplary embodiment of the present invention implements an active shape model that is based upon a known statistical model of object shape. In an offline operation, a labeled training set 1040 is provided to the CPU 12, for fitting to an ASM.

In this case, the training set comprises a set of images of, for example, human faces, each recorded under controlled diffuse illumination such that each image in the training set provides an example of expected reflectance edges in a human face. The training set is manually coded to indicate each of the edges depicted in the respective image file, as in the discriminative classifier exemplary embodiment of the present invention.

In steps 1100 and 1102, the CPU 12 is operated to fit the images of the training set to an ASM and to create a canonical template of expected reflectance edge locations, magnitudes and orientations, according to a known active shape modeling technique. In step 1104, the CPU 12 outputs an object edge template.

According to a feature of the present invention, the object edge template is utilized by the CPU 12 in a run-time operation. In steps 1106 and 1108, the CPU 12 performs an operation to fit an image of an input image file 1000 to the ASM (step 1106) and to detect edges in the image, for example, via a Canny edge detector (step 1108).

In step 1110, the CPU 12 aligns the ASM fit based upon the image of the input image file 18, with the canonical object edge template. In step 1112, the CPU 12 compares the alignment result (step 1110) to the edges detected via the Canny edge detector (step 1108) to identify edges that are unexpected from those predicted by the ASM alignment. Such unexpected edges correspond to, for example, sharp shadow edges of the image or a specularity depicted in the input image file 18, and are retained and output as shadow edges (step 1004).

Referring once again to FIG. 3, upon completion of step 1004, to find illumination/shadow edges, using one of the above described techniques of using intrinsic images, using a direct, discriminative classifier, using an active shape model, or combinations thereof, the CPU 12 proceeds to step 1006, to modify the image gradients (step 1002) near the shadow edges identified in step 1004. The modifications of gradients near shadow edges are performed to eliminate or reduce the potentially undesirable illumination effects such as cast shadows and strong trends, for improved performance of computer vision functionality and other image processing tasks.

According to a feature of the present invention, the CPU 12 can execute step 1006 by implementing any one of several different modification techniques, for example, a simple masking, an orthogonal projection or a fitting to an illumination profile.

Figure 11A:
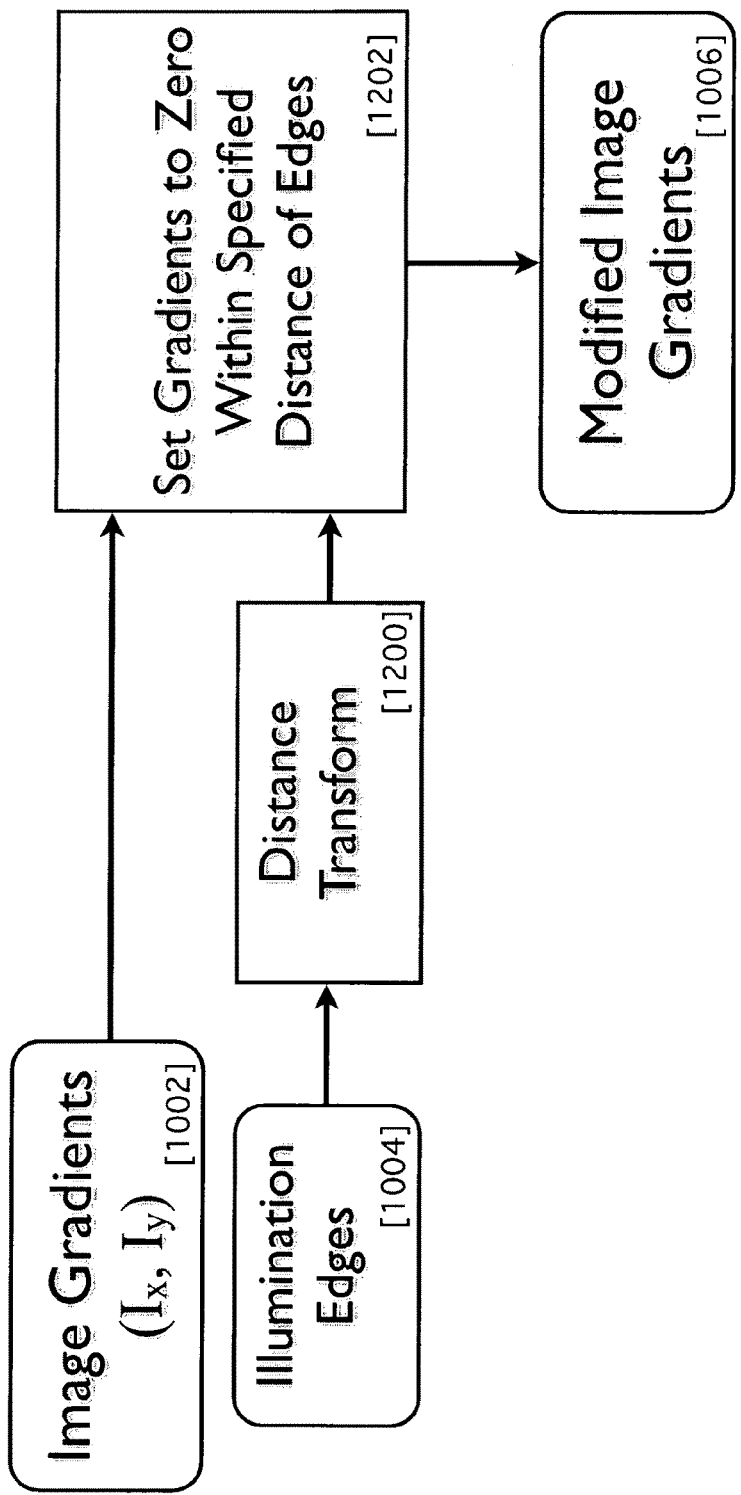
FIG. 11a is a flow chart for modifying shadow edge gradients, using a simple masking, according to a feature of the present invention.

FIG. 11*a* shows a flow chart for modifying shadow edge gradients, using a simple masking, according to a feature of the present invention. In step 1200, the illumination edges identified in step 1004 are subject to a distance transform to identify pixels within a specified distance for the edges identified in step 1004. In step 1202, the CPU 12 masks the edge gradients by setting the gradients (as calculated in step 1002) for the pixels within a specified distance (as determined by the distance transform of step 1200) to zero, and then outputs the modified gradients (step 1006 of FIG. 3) for use in step 1008 (FIG. 3).

Figure 11B:
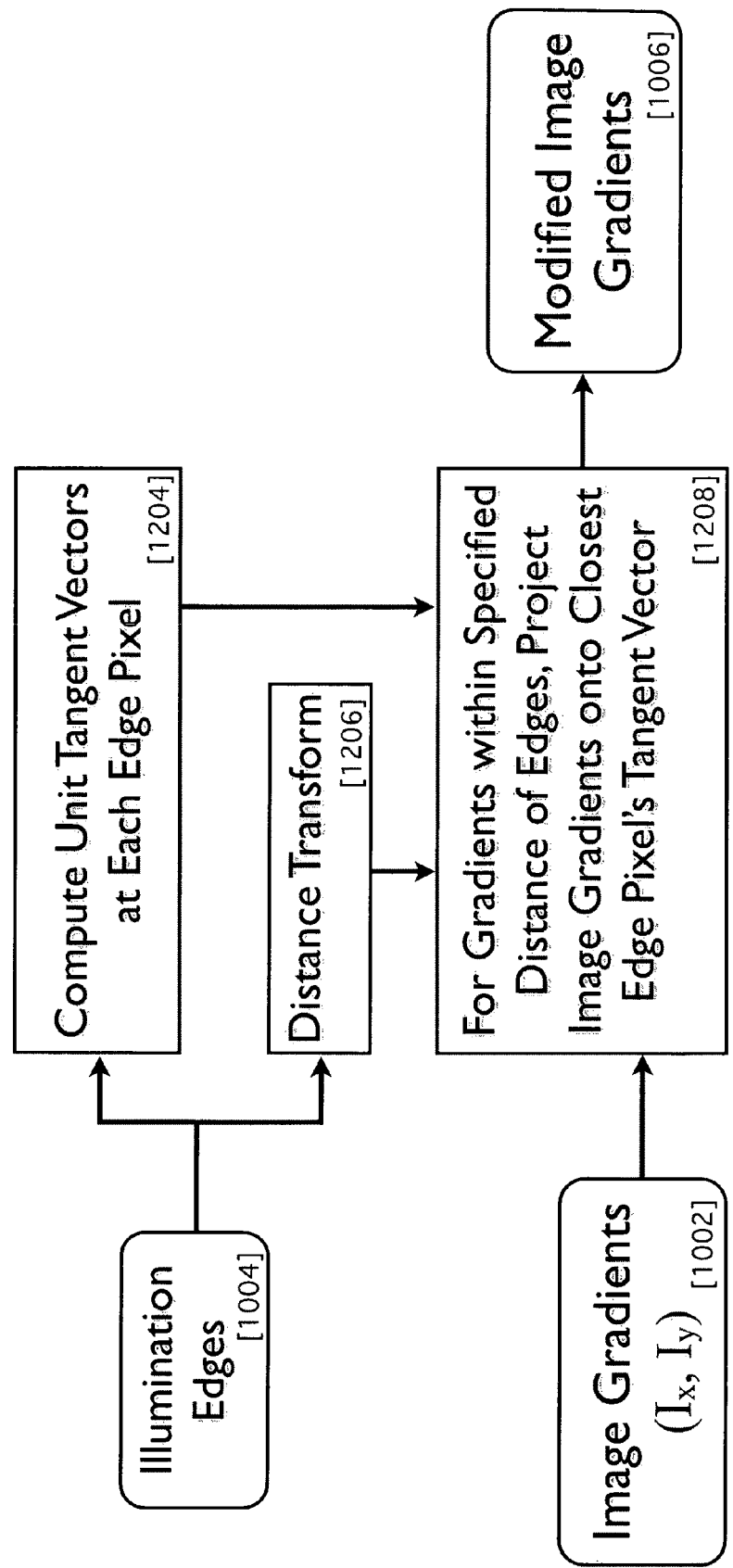
FIG. 11b is a flow chart for modifying shadow edge gradients, using an orthogonal projection, according to a feature of the present invention.
Figure 11C:
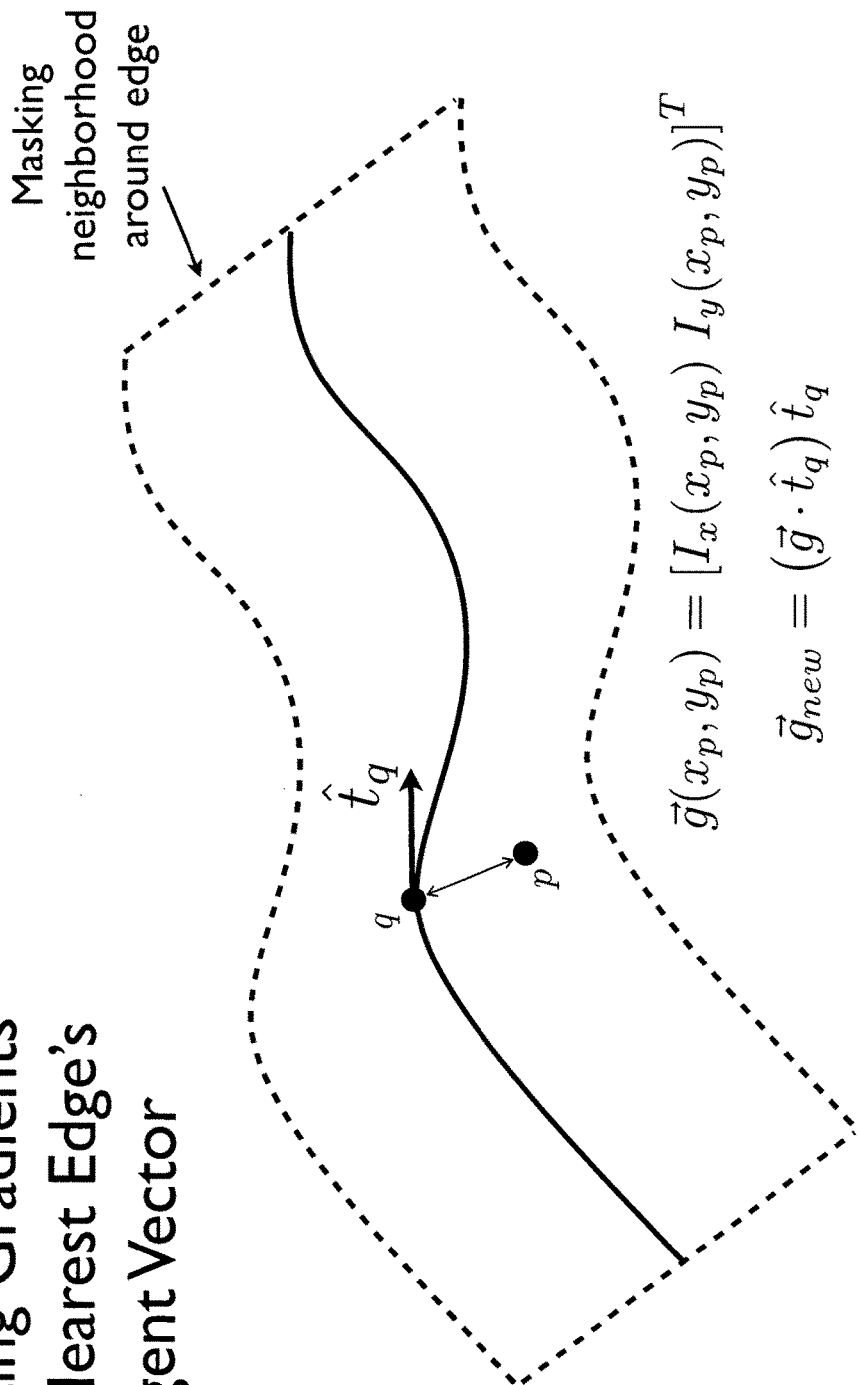
FIG. 11c shows an illumination edge of an image, with a unit tangent vector t of an edge pixel, for use in the orthogonal projection of the routine of FIG. 11b.

FIG. 11*b* shows a flow chart for modifying shadow edge gradients, using an orthogonal projection, according to a feature of the present invention. In step 1204, unit tangent vectors t are computed for each pixel of each of the illumination edges identified in step 1004, as shown in the example of FIG. 11*c*. Gradient vectors g at points p within a specified distance of an illumination edge under examination (as determined by a distance transform (step 1206)) are projected onto the unit tangent vector of the closest edge pixel q (also determined by the distance transform of step 1206). The resulting projected gradient is used as the modified gradient (step 1006) for use in the reintegration in step 1008 of FIG. 3. The equation for the projection is set forth in the example of FIG. 11*c*.

Figure 11D:
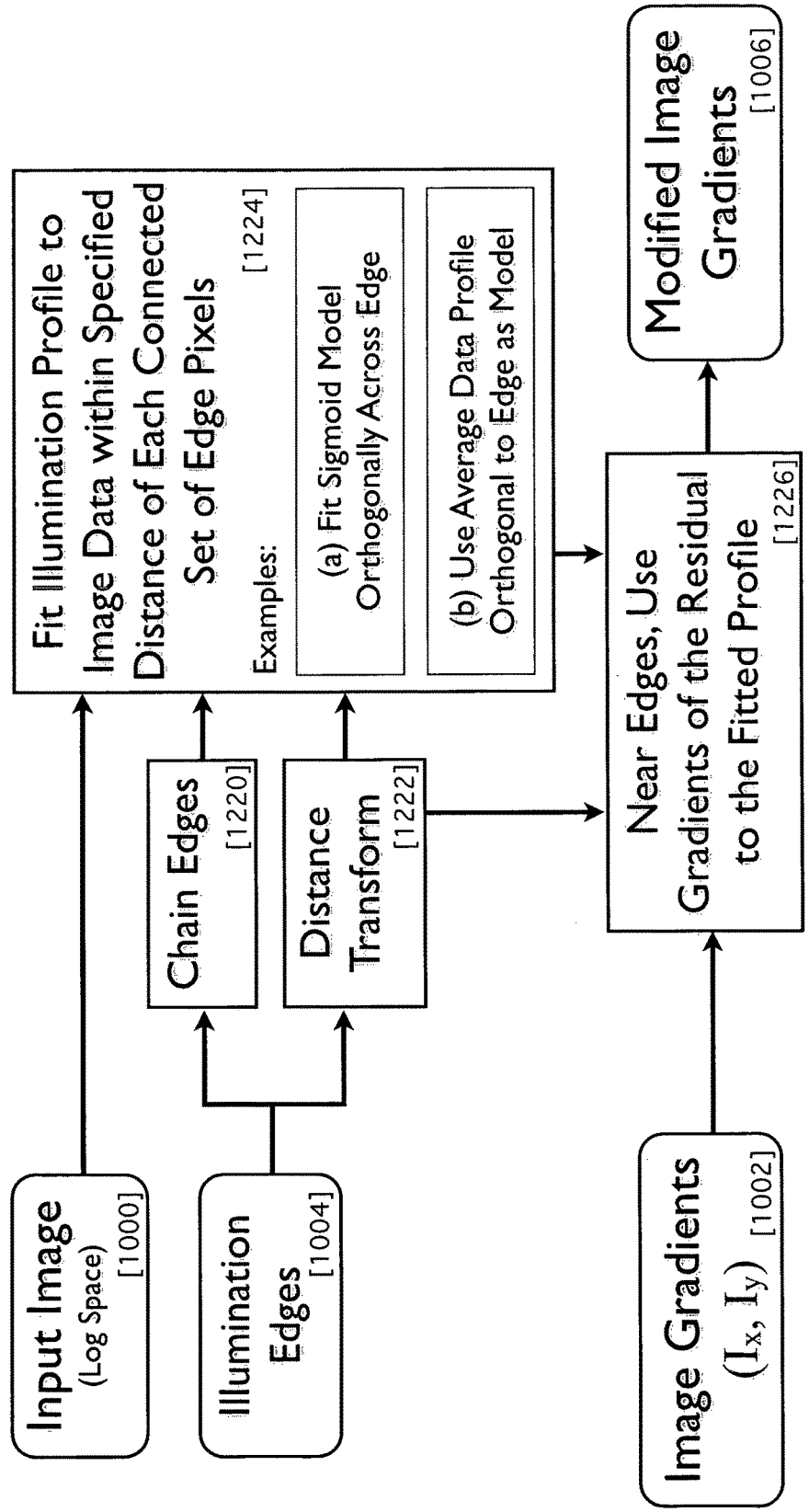
FIG. 11d is a flow chart for modifying shadow edge gradients, using a technique to fit an illumination profile to underlying image data, according to a feature of the present invention.

FIG. 11*d* shows a flow chart for modifying shadow edge gradients, using a fitting to an illumination profile technique, according to a feature of the present invention. Using image data taken from each edge "chain" (set of connected, spatially ordered edge pixels (steps 1220 and 1222), an illumination profile is fitted in step 1224 to the image data along the D axis in edge space, as shown in FIG. 9*b*. The fitted profile can be, for example, the average data profile along the T axis of edge space, or a sigmoid-shaped model explicitly fitted to the data along the T axis. Within a specified distance of each of the illumination edges (step 1004) (as determined by the distance transform of step 1222), original image gradients are replaced by gradients of the residual to the fitted profile for each edge. These residual gradients (step 1006) are then used as the modified gradients for reintegration in step 1008 of FIG. 3.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense. rather than a restrictive sense.

What is claimed is:

1. An automated, computerized method for processing an image, comprising the steps of:
   providing an image file depicting an image, in a computer memory;
   identifying shadow edges in the image, the shadow edges being identified in an illumination image generated from the image by an optimized solution to an [A][x]=[b] matrix equation wherein [A] expresses values of 0's, 1's and −1's, determined by a constraining relationship derived from same material information, [b] expresses recorded information for the image, and [x] expresses an unknown illumination component of the image;
   computing gradient information for the image; and
   modifying the gradient information relative to the shadow edges for improved performance of computer functionality in an image processing operation.

2. The method of claim 1 wherein the improved performance of computer functionality in an image processing operation is relative to a computer vision task.

3. The method of claim 2 wherein the computer vision task comprises a face recognition task.

4. The method of claim 1 wherein the step of modifying the gradient information relative to the shadow edges for improved performance of computer functionality in an image processing operation is carried out by performing one of a simple masking technique, an orthogonal projection or a fitting to an illumination profile.

5. The method of claim 1 including the further step of providing an output image based upon an estimate made as a function of modified gradient information.

6. The method of claim 5 wherein the step of providing an output image based upon an estimate is carried out by performing a reintegration as a function of modified gradient information to provide an output image optimized for an image processing operation.

7. The method of claim 6 wherein the step of performing a reintegration as a function of modified gradient information to provide an output image is carried out relative to the image.

8. The method of claim 6 wherein the step of performing a reintegration as a function of modified gradient information to provide an output image is carried out relative to an intrinsic image generated from the image.

9. A computer system which comprises:
   a CPU; and
   a memory storing an image file containing an image;
   the CPU arranged and configured to execute a routine to identify shadow edges in the image, the shadow edges being identified in an illumination image generated from the image by an optimized solution to an [A][x]=[b] matrix equation wherein [A] expresses values of 0's, 1's and −1's, determined by a constraining relationship derived from same material information, [b] expresses recorded information for the image, and [x] expresses an unknown illumination component of the image, compute gradient information for the image and modify the gradient information relative to the shadow edges for improved performance of computer functionality in an image processing operation.

10. A computer program product, disposed on a non transitory computer readable media, the product including computer executable process steps operable to control a computer to: access an image file depicting an image, in a computer memory, identify shadow edges in the image, the shadow edges being identified in an illumination image generated from the image by an optimized solution to an [A][x]=[b] matrix equation wherein [A] expresses values of 0's, 1's and −1's, determined by a constraining relationship derived from same material information, [b] expresses recorded information for the image, and [x] expresses an unknown illumination component of the image, compute gradient information for the image and modify the gradient information relative to the shadow edges for improved performance of computer functionality in an image processing operation.

11. The computer program product of claim 10 wherein the improved performance of computer functionality in an image processing operation is relative to a computer vision task.

12. The computer program product of claim 11 wherein the computer vision task comprises a face recognition task.

13. The computer program product of claim 10 wherein the process step to modify the gradient information relative to the shadow edges for improved performance of computer functionality in an image processing operation is carried out by performing one of a simple masking technique, an orthogonal projection or a fitting to an illumination profile.

14. The computer program product of claim 10 including the further process step operable to control a computer to: provide an output image based upon an estimate made as a function of modified gradient information.

15. The computer program product of claim 14 wherein the process step to provide an output image based upon an estimate is carried out by performing a reintegration as a function of modified gradient information to provide an output image optimized for an image processing operation.

16. The computer program product of claim 15 wherein the process step to perform a reintegration as a function of modified gradient information to provide an output image is carried out relative to the image.

17. The computer program product of claim 15 wherein the process step to perform a reintegration as a function of modified gradient information to provide an output image is carried out relative to an intrinsic image generated from the image.

18. A computer program product, disposed on a non transitory computer readable media, the product including computer executable process steps operable to control a computer to: access an image file depicting an image, in a computer memory, identify shadow edges in the image, the shadow edges being identified in an illumination image generated from the image by an optimized solution to an [A][x]=[b] matrix equation wherein [A] expresses values derived from an equation defining a constraining relationship based upon same material information, [b] expresses recorded information for the image, and [x] expresses an unknown illumination component of the image, compute gradient information for the image and modify the gradient information relative to the shadow edges for improved performance of computer functionality in an image processing operation.

* * * * *